United States Patent
Kreitzman

Patent Number: 5,427,285
Date of Patent: Jun. 27, 1995

[54] BICYCLE DRINK BOTTLE INSULATOR

[76] Inventor: Ralph J. Kreitzman, 74 Old Pond Rd., Great Neck, N.Y. 11023

[21] Appl. No.: 141,128

[22] Filed: Oct. 21, 1993

[51] Int. Cl.⁶ .............................. B62J 7/00
[52] U.S. Cl. .................... 224/32 R; 224/34; 220/903; 220/739
[58] Field of Search ............. 224/32 R, 34, 30 R, 224/148, 39; 215/12.1; 220/903, 739, 902

[56] References Cited

U.S. PATENT DOCUMENTS

| | | | |
|---|---|---|---|
| 4,883,205 | 11/1989 | Saelens et al. | 224/32 R |
| 5,007,566 | 4/1991 | Fick | 224/30 R |
| 5,110,020 | 5/1992 | Uhl | 224/32 R |

Primary Examiner—Henry J. Recla
Assistant Examiner—David J. Walczak

[57] ABSTRACT

A bicycle drink bottle insulator that wraps around, or comprises or is part of, a bicycle drink bottle holder (commonly called a "cage") that is affixed to a bicycle, thereby insulating the bottle. The insulator may have a bottom, an aerodynamic shape, and a strap for affixing the insulator.

9 Claims, 4 Drawing Sheets

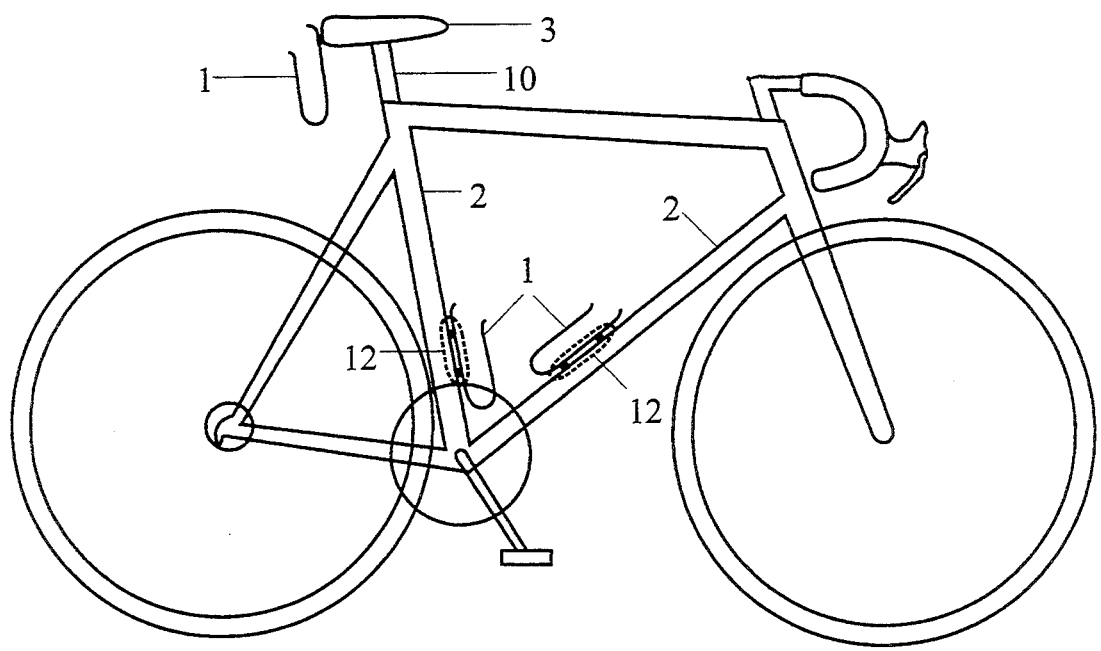
Prior Art
Fig. 1
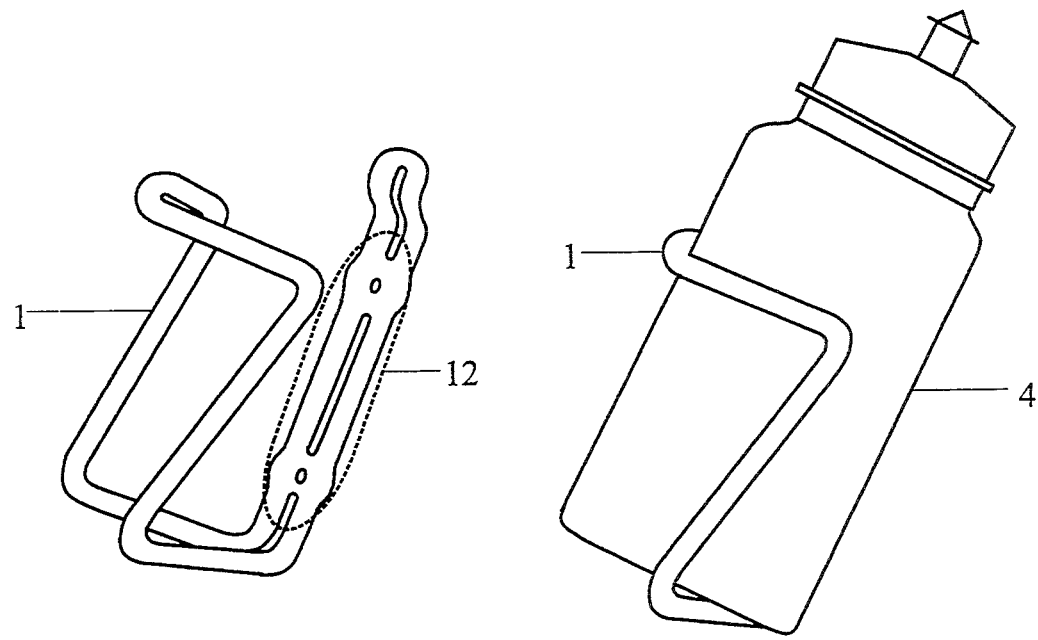
Prior Art
Fig. 2
Prior Art
Fig. 3

BICYCLE DRINK BOTTLE INSULATOR

BACKGROUND OF THE INVENTION

This invention relates to an insulator that wraps around, or is part of, a bicycle drink bottle holder that is affixed to a bicycle, thereby insulating the bottle without interfering with its insertion or removal from the holder.

Bicycling can be a strenuous and beneficial form of exercise. When exercising, people need to replenish water lost through sweating. When bicycling, because of the constant flow of air, typically warm air, over the body, which causes sweat to evaporate often immediately, people often do not realize the amount they sweat. However, the benefits of this invention are not limited to serious bicyclers. Even recreational or slow bicyclers seek liquid when they bicycle.

Most bicycles manufactured today include brace on mounts or lugs on the frame to which bicycle drink bottle holders (commonly called "cages") are installed. Even if mounts or lugs are not included, cages easily are installed to bicycle frames. Some cages are affixed to the seat of the bicycle or, possibly, elsewhere. The cage holds, but offers no insulation for, a bicycle drink bottle.

It has been observed that, for the same reason sweat evaporates for a moving bicyclist, warm air passing over a bottle warms the liquid in the bottle more quickly than if the bottle was just placed on the ground. Because cold drinks generally are preferred over tepid or warm drinks and cold drinks are absorbed more rapidly than warm ones, a number of methods or devices have been used to keep the liquid in bicycle bottles cool. Freezing the bottle with its liquid is one method. However, this does not delay the inevitable warming for long. Bottles that contain ice, either loose or in an enclosed smaller container, or a solid core of ice, suffer the same result. (These methods can be used in the present invention, with the result that the liquid will stay cool even longer.) Insulated bottles exist, but most bicyclists do not use them because of their cost, reduced storage capacity, difficulty to use or other reasons. Insulators that fit on the bottle suffer some of the same deficiencies and can interfere with the insertion and removal of the bottle from the cage. Bottle insulators that do not permit the bottle to be affixed to the bicycle also exist but for various reasons are not preferred.

It is observed that most bicyclists, especially serious ones and professionals, only use traditional bottles in traditional cages for lack of a better bottle insulator.

SUMMARY OF THE INVENTION

It is the object of the present invention to provide a simple and effective means for insulating a bicycle drink bottle that is in a bicycle bottle holder (commonly called a "cage") that is affixed to a bicycle. It is a further object that the insulator, which may comprise or be a part of the cage, permit the use of any bottle that will fit in the cage without interfering with the removal or reinsertion of the bottle. Also, a further object is for the insulator, if not a part of the cage, to be easily and quickly installed and removed. Although not yet tested for aerodynamics, a further object will be to manufacture insulators in a form that is more aerodynamic than the bottle that it insulates.

Briefly stated, those objects are attained in an insulating material that wraps around and is affixed to the outside of a cage, or comprises or is combined with a cage, that is affixed to a bicycle.

BRIEF DESCRIPTION OF THE DRAWINGS

FIG. 1 shows a bicycle with drink bottle holders (or cages) affixed to the frame and seat of the bicycle.

FIG. 2 shows a bicycle drink bottle holder.

FIG. 3 shows a bicycle drink bottle in the bottle holder.

DETAILED DESCRIPTION OF THE INVENTION

Figure 4:
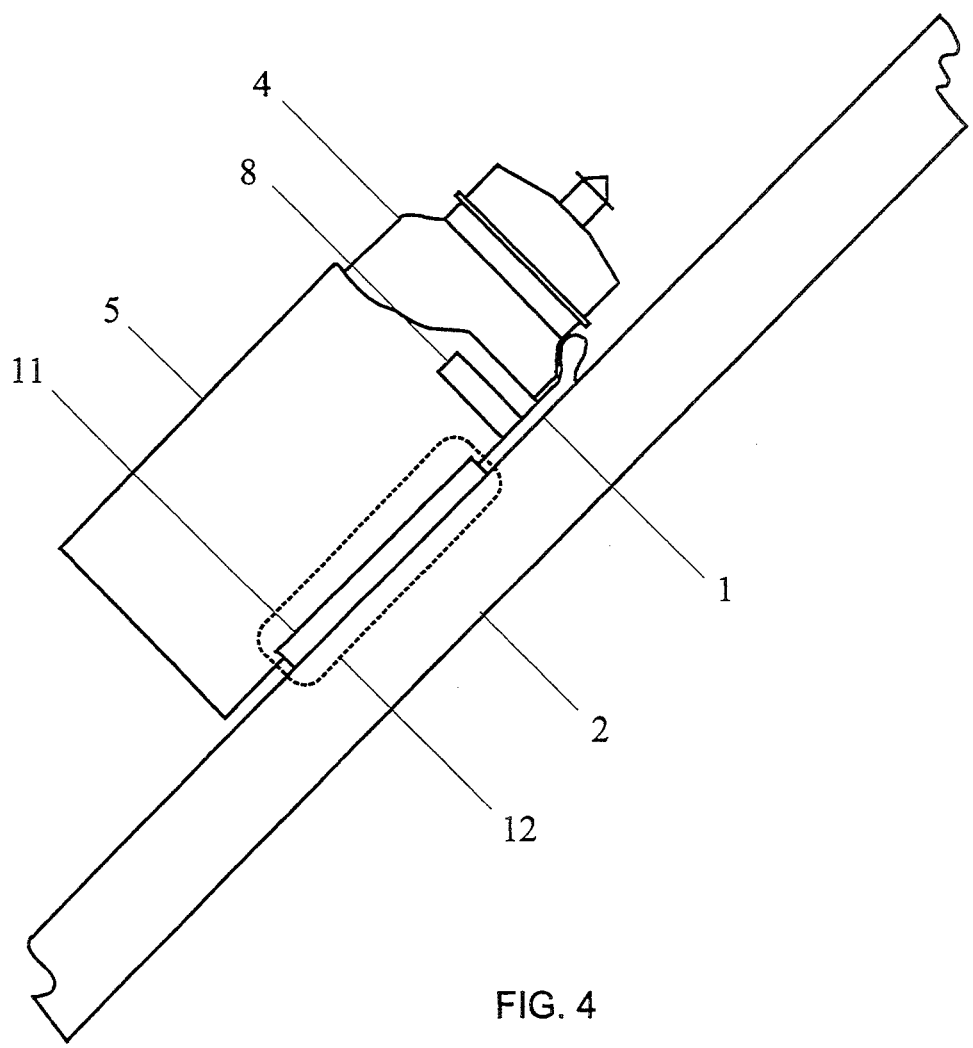
FIG. 4 shows one embodiment of the invention installed on a bottle holder affixed to a bicycle frame, viewed from the side.
Figure 5:
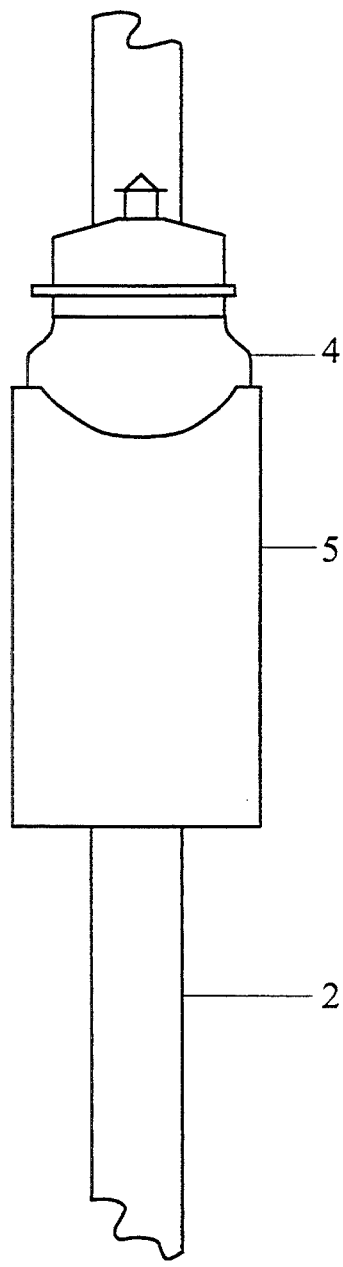
FIG. 5 shows the same embodiment of the invention installed as shown in FIG. 4, viewed from the front.

The present invention is a form of bicycle drink bottle insulator that wraps around a bicycle drink bottle holder (commonly referred to as a "cage"), or is a form of a cage that is constructed of or incorporates an insulating material, that is affixed to the bicycle. The invention is readily understood upon reference to FIG. 4, 5, 6 and 7, which show one embodiment of the present invention. That embodiment comprises an ordinary bicycle cage (1) affixed to the frame of a bicycle (2) to which the invention has been added. The cage (1) need not be in the forms shown in FIG. 1 or 2 through 4, nor need it be affixed to the bicycle frame (2) or seat (3) in the manner shown. Also, neither the bicycle (FIG. 1) nor the bottle (4) need be in the form shown in the figures.

The invention utilizes an insulating material (5) that is configured or constructed in a manner so that it wraps around the cage (1), or comprises or is incorporated with a cage (FIG. 8), thereby insulating the enclosed bottle (4). The insulating material (5) may consist of various forms including, without limitation, absorbent or non-absorbent foam, hard or soft plastic or moldable material, fabric or a combination of the foregoing or other compounds. The insulating material (5) may be supported by, or configured to include, a rigid or semi rigid material contained within or on the inner side of the insulating material (5) which also may assist the insertion and removal of the bottle (4) from the cage (1). The material or surface of the insulator (5) that is in contact with the bottle (4) must permit a wet and, if possible, dry bottle (4) to be inserted and removed from the cage (1) with little or no more effort than if the invention was not installed.

Figure 7:
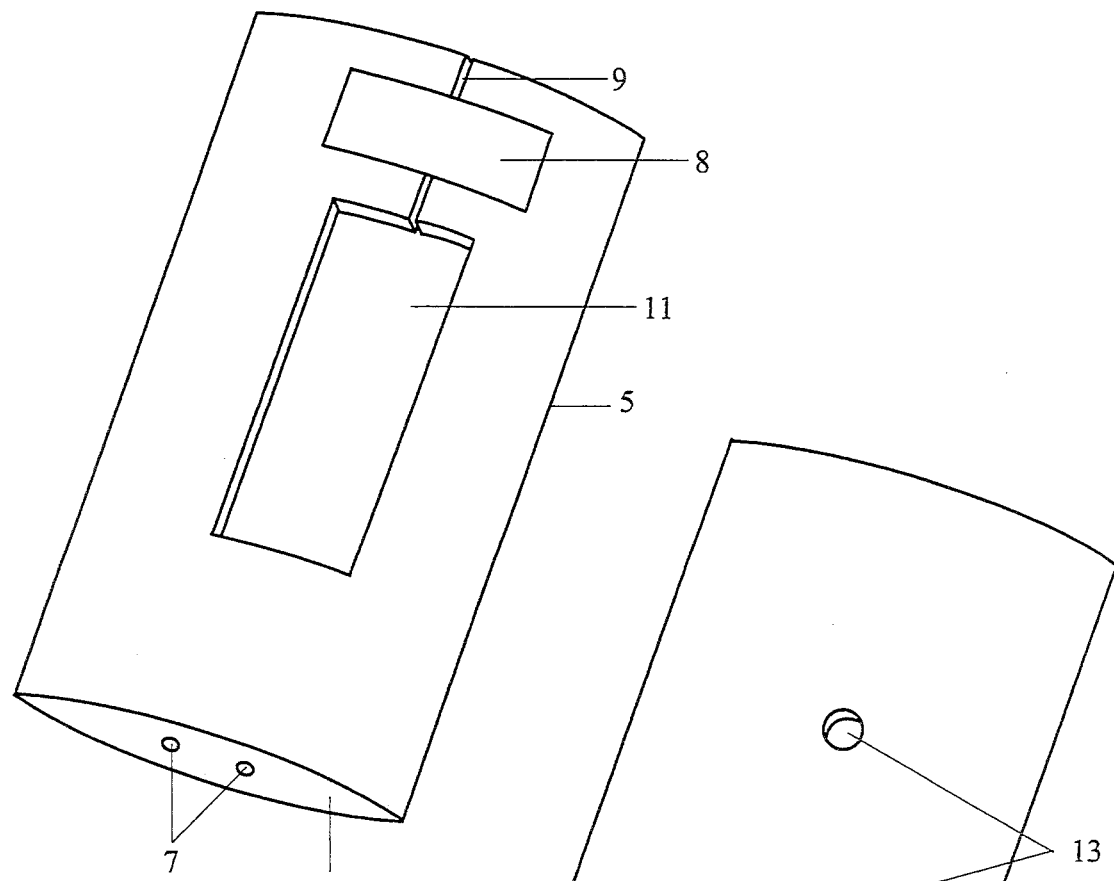
FIG. 7 shows the same embodiment of the invention, not installed.
Figure 8:
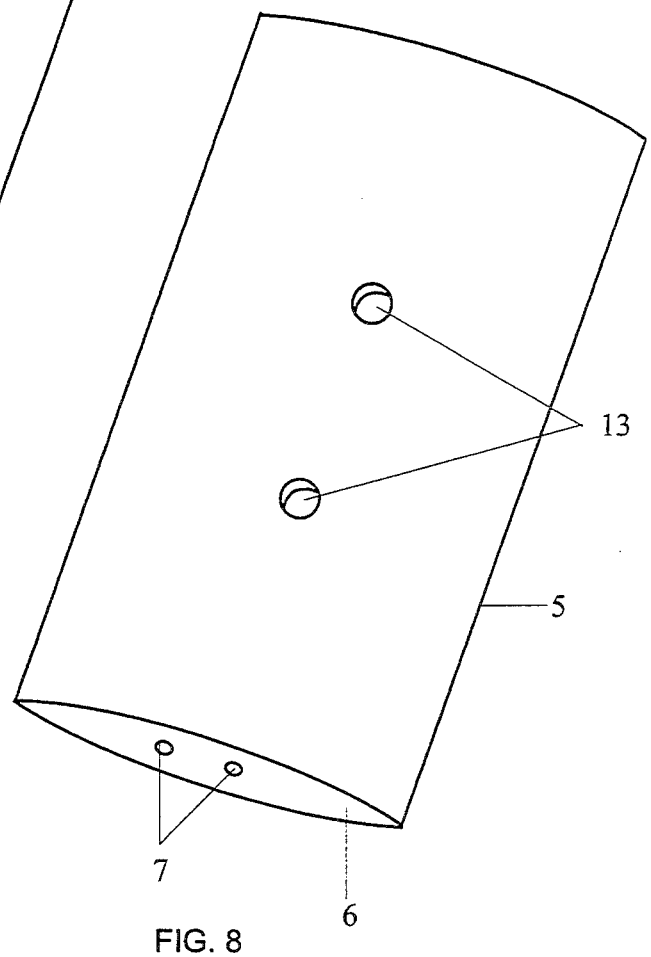
FIG. 8 shows another embodiment of the invention, not installed.

The invention can have an insulated or non-insulated bottom (6), with or without a drainage hole or holes (7). FIG. 7 and 8 show two embodiments of the invention each with a bottom (6) and drainage holes (7). While the insulation benefit will be diminished, it need not have such a bottom (6).

Figure 6:
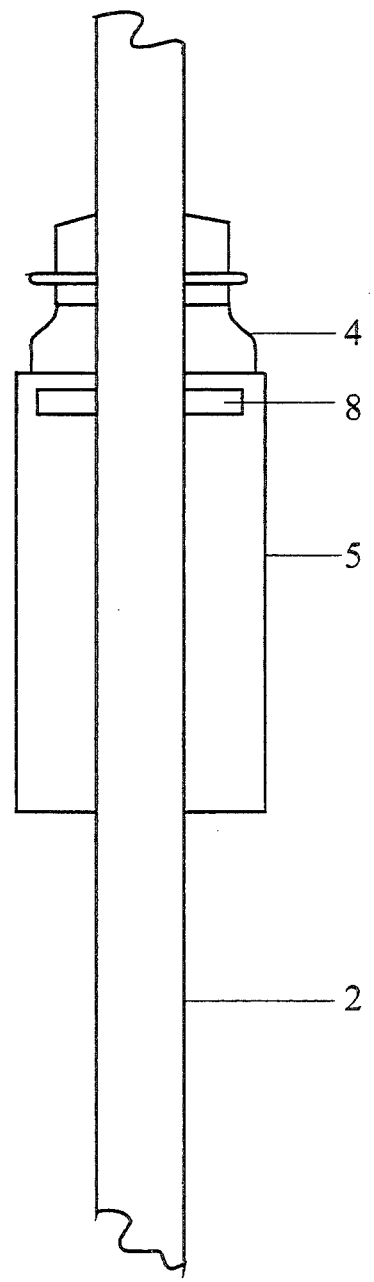
FIG. 6 shows the same embodiment of the invention installed as shown in FIG. 4, viewed from the rear.

One embodiment of the invention is affixed to the cage (1), as shown in FIG. 4, 6 and 7, by a strap (8) with a closure device. The strap (8) can encircle the invention or its ends can be affixed on either side of the cut (9), which is necessary when the cable (1) is affixed to a bicycle frame (2), to permit the invention to bypass the attachment of the cage (1) to the frame (2). For cages (1) affixed to a seat (3) or by other means, while a cut (9) may not be necessary, a strap (8) still is. The closure device could consist, for example, of a self-locking hook and loop device, such as Velcro (R), affixed to the strap (8). The strap (8) also can encircle the frame (2) or a portion of the seat (3) or its post (10) rather than just the invention and the cage (1). FIG. 8 shows one embodiment of the invention that comprises a cage or incorporates a cage and insulation (5) that should not need a strap (8), but will require a means to affix it to the bicycle (FIG. 1).

The invention, as noted above and shown in FIG. 4 and 7, is configured with an opening (11) in its surface so that it avoids the portion (12) of the cage (1) that is affixed to the frame (2). As noted above, cages (1) attached in other manners, see the cage (1) affixed to the seat (3) shown in FIG. 1 for example, may not require that the invention be so configured.

The preferred embodiment of the invention has been optimized so that it can be installed as a separate component over an existing cage (1) of one of the many types commonly used. However, as noted above, an integrated insulated cage also could be constructed wherein the insulating material (5) is molded around the frame elements of a cage or where the cage itself is comprised of an insulating material with or without additional support and with a means of affixing (13) it to a bicycle. FIG, 8 shows an embodiment of the invention in the form of an integrated insulated cage.

The invention cam be configured in an aerodynamic shape which may or may not be more aerodynamic than a bottle (4) in a cage (1) to which the invention is not installed or a part.

The embodiments described above clearly realize the stated objects of the invention, but are not intended as an exhaustive compilation of the invention's content of patentable novelty. Numerous further variants will be obvious and may be effected by anyone skilled in the art without departing from the scope or spirit of the invention.

I claim:

1. A drink bottle insulator comprising:

a hollow cylindrical insulating cover having an inside surface, an outside surface, a top side and a bottom side, said insulating cover being made of a first insulating material;

said insulating cover having an aperture extending from a first point below the top side of said insulating cover to a second point below said first point and above the bottom side of said insulating cover, and extending from said inside surface through to said outside surface;

said insulating cover containing a slit extending from said first point to said top side, said insulating cover having a first edge and a second edge bounding said slit; and a means for closing said first and said second edges of said slit.

2. The drink bottle insulator of claim 1 wherein said insulating cover is affixed at a point near said bottom side of said insulating cover to a bottom panel.

3. The drink bottle insulator of claim 2 wherein said bottom panel is made from a second insulating material, said second insulating material is selected from the class consisting of absorbent foam, non-absorbent foam, hard plastic, soft plastic, moldable plastic, fabric, or a combination thereof.

4. The drink bottle insulator of claim 2 wherein said insulating cover and said bottom panel are integrated.

5. The drink bottle insulator of claim 1 wherein said first insulating material is selected from the class consisting of absorbent foam, non-absorbent foam, hard plastic, soft plastic, moldable plastic, fabric, or a combination thereof.

6. The drink bottle insulator of claim 1 wherein said bottom panel contains at least one drainage hole.

7. The drink bottle insulator of claim 1 wherein said means for closing the slit is a hook and a loop closure device.

8. The drink bottle insulator of claim 1 wherein said insulating cover is made of sufficient rigidity to easily insert and remove a water bottle.

9. The drink bottle insulator of claim 1 wherein said insulator forms an aerodynamic shape.

* * * * *